United States Patent [19]
Busby

[11] Patent Number: 5,306,036
[45] Date of Patent: * Apr. 26, 1994

[54] BICYCLE REAR SUSPENSION

[75] Inventor: James S. Busby, Laguna Beach, Calif.

[73] Assignee: GT Bicycles, Inc., Santa Ana, Calif.

[ * ] Notice: The portion of the term of this patent subsequent to Nov. 9, 2010 has been disclaimed.

[21] Appl. No.: 87,998

[22] Filed: Jul. 2, 1993

Related U.S. Application Data

[63] Continuation of Ser. No. 4,131, Jan. 13, 1993, Pat. No. 5,259,637.

[51] Int. Cl.$^5$ ............................................. B62K 25/28
[52] U.S. Cl. .................................................. 280/284
[58] Field of Search ............... 280/275, 283, 284, 288, 280/281.1; 180/227

[56] References Cited

U.S. PATENT DOCUMENTS

| | | | |
|---|---|---|---|
| 578,615 | 3/1897 | Travis | 280/284 |
| 606,323 | 6/1898 | Wronski | 280/284 |
| 657,667 | 9/1900 | Mills | 280/284 |
| 944,795 | 12/1909 | Leet et al. | 280/284 |
| 1,047,430 | 12/1912 | Michealson | 280/284 |
| 1,412,012 | 4/1922 | Bruno | 280/284 |
| 1,594,079 | 7/1926 | Tanner | 280/284 |
| 3,917,313 | 11/1975 | Smith et al. | 280/284 |
| 4,322,088 | 3/1982 | Miyakoshi et al. | 280/284 |
| 4,390,095 | 10/1980 | Becker | 280/284 |
| 4,506,755 | 3/1985 | Tsuchida et al. | 180/227 |
| 4,529,056 | 7/1985 | Kreuz | 180/227 |
| 4,673,053 | 6/1987 | Tanaka et al. | 180/227 |
| 4,789,174 | 12/1988 | Lawwill | 280/284 |
| 4,951,791 | 8/1990 | Creixell | 180/219 |
| 4,997,197 | 3/1991 | Shultz | 280/275 |
| 5,098,114 | 3/1992 | Jones | 280/284 |
| 5,121,937 | 6/1992 | Lawwill | 280/284 |
| 5,205,572 | 4/1993 | Buell et al. | 280/284 |
| 5,244,224 | 9/1993 | Busby | 280/284 |

FOREIGN PATENT DOCUMENTS

| | | | |
|---|---|---|---|
| 3033294 | 4/1981 | Fed. Rep. of Germany | 280/285 |
| 428442 | 12/1947 | Italy | 280/285 |
| 220760 | 8/1924 | United Kingdom | |

OTHER PUBLICATIONS

1992 Cannondale Spec-Suspension Mountain Bicycles-Article-10 pgs.
Trek 9000 Series Spec-"This Beauty Is A Beast"-Article-8 pgs.
Fisher RS-1-Article-4 pgs.-Mountain Bike Action/-Mar. '92.
Suspension Mania Strikes Cycling-Mountain Bike Action/Feb. '92 3 pgs.
Boulder Intrepid Al-2 pgs.-Mountain Bike Action/-Mar. '92.

(List continued on next page.)

Primary Examiner—Karin L. Tyson
Assistant Examiner—Victor E. Johnson
Attorney, Agent, or Firm—Stetina and Brunda

[57] ABSTRACT

A bicycle rear suspension linkage system comprising an elongate seat tube having an upper pivot mount rigidly attached to the upper end thereof and an axle receiving bracket rigidly attached to the lower end thereof. An upper rocker is pivotally connected to the upper pivot mount with a lower rocker being pivotally connected to a lower pivot mount rigidly attached to the axle receiving bracket. The linkage system further comprises pairs of seat stay and chain stay members, with the upper ends of the seat stay members being pivotally connected to the upper rocker and the front ends of the chain stay members being pivotally connected to the lower rocker. Additionally, the back ends of the chain stay members are pivotally connected to the lower ends of the seat stay members. Also provided is a shock absorber having a body portion and a reciprocal piston rod, the distal end of which is pivotally connected to the upper pivot mount. Pivotally connected to and extending between the upper rocker and body portion of the shock absorber is a pair of upper link rods, while rigidly attached to the body portion is an elongate alignment rod. Pivotally connected to and extending between the lower end of the alignment rod and the front ends of the chain stay members is a lower link rod.

3 Claims, 3 Drawing Sheets

OTHER PUBLICATIONS

Team Shockblok-6 pgs.-Mountain Bike Action/Jul. '92.

Mountain Bike Action, Oct. 1992, pp. 10, 25-26, 28-29, 31, 36-37, 39-41, 44 45, 47, 58, 70, 73, 76, 79, 123, and 130.

Bicycling, Nov. 1992, pp. 26-27, 58, 63-64, and 105.

Mountain Biking Nov. 1992, vol. 6, No. 11, pp. 6-9, 25, 48-49, 65, 71, 73, 108-109, 115, 124, 129, 140, 143, 163 and 169.

Mountain Biking, Dec. '92, pp. 1-2, 5, 18, 44-49, 77, 127, and 160.

Mountain Biking, Jan. '93, vol. 7, No. 1, pp. 32-33, 40, 45, 71, 75, 82-83, 115 and 117.

Welcome to the Next Generation . . . —9 pgs.-Mountain Bike-Jun. '92.

SCHWINN S.A.S.S.-7 pgs.-Mountain Bike Action-May '92.

Offroad Pro-Flex 550-3 pgs.-Offroad.

If The Best Motorcycle . . . "Litespeed Suspension", Mountain Bike-Jul. '9 8 pgs.

Slingshot-*Mountain & City Biking*, 6 pgs.

Guide to Suspension and High Performance vol. 3 1992, pp. 9, 13-15, 17, 30-31, 36-37, 42-45, 47, 53, 60, 69, 71, 76, 85-87, '92, 96, 98, 100, 108-112, 117 and 119.

5,306,036

BICYCLE REAR SUSPENSION

The present application is a continuation of application Ser. No. 08/004,131 filed Jan. 13, 1993 and issued as U.S. letters patent No. 5,259,637 on Nov. 9, 1993.

FIELD OF THE INVENTION

The present invention relates generally to bicycles, and more particularly to a rear suspension system for a bicycle frame which possesses shock absorption characteristics and is adapted to not adversely affect the performance of the bicycle.

BACKGROUND OF THE INVENTION

The primary structural component of a bicycle is the bicycle frame. Typically, the bicycle frame comprises an elongate cross bar which is rigidly secured to and extends between a head tube of the bicycle and a seat tube of the bicycle. The head tube typically provides a structural base for the stem of the bicycle to which the handlebars are attached. The seat tube provides a base for a seat post which is generally telescopically received therewithin and to which is secured the saddle or seat of the bicycle. In typical bicycle frame construction, the seat tube includes a generally cylindrically axle-receiving bracket attached to the lower end thereof which is adapted to receive the bottom bracket axle. The bottom bracket axle typically extends between and interconnects the cranks to which are attached the pedals. Rigidly secured to and extending between the head tube and the cylindrical axle-receiving bracket is an elongate down tube.

In addition to the aforementioned structural components, rigidly secured to and extending rearwardly from the axle-receiving bracket are first and second chain stay members. Additionally, rigidly secured to and extending downwardly from the upper end of the seat tube are first and second seat stay members having distal ends which are rigidly secured to the back ends of the first and second chain stay members. Typically, the distal ends of the seat stay members and back ends of the chain stay members are interconnected in a manner adapted to receive the rear tire axle of the bicycle.

The foregoing description generally represents the construction of conventional prior art bicycle frames. Typically, once such prior art frames are constructed, the aforementioned structural components are rigidly secured to one another through the use of welding or brazing techniques. Though this method of constructing the bicycle frame provides the resulting frame with structural integrity, the bicycle frame does not possess a suspension having shock absorbing characteristics. As will be recognized, the ride, comfort and performance of the bicycle would be greatly enhanced if the bicycle frame were adapted to at least partially accommodate the shocks routinely encountered while riding the bicycle.

Though recent prior art bicycle frames include front and/or rear shock absorbing assemblies, such bicycle frames possess certain deficiencies which detract from their overall utility. In this respect, the manner in which the rear shock absorbing assemblies are typically interfaced to the seat stay members of the frame creates a significant amount of lateral instability for the rear wheel of the bicycle. As will be recognized, such instability severely diminishes the performance and handling characteristics of the bicycle. Additionally, many currently known rear shock absorbing assemblies create slop within the chain during normal and vigorous pedaling, thus adversely affecting the performance of and speed obtainable with the bicycle. Further, in most prior art rear shock absorbing assemblies, the rear axle pivots about a single point when subjected to a shock force which results in the pedaling forces either compressing or extending the shock absorber of the rear suspension, and/or the rear tire axle moving in a direction other than parallel to the direction of the shock force applied to the rear wheel. In this respect, when the shock absorber of the rear suspension is affected by the pedal force, some of the riders' energy is needlessly wasted to activate the shock absorber. Additionally, when the rear tire axle moves in an arc that is not tangent to the direction of the shock force applied to the rear wheel, riding efficiency is lost.

As previously specified, the rear suspension is often affected by the pedal force, thus causing some of the rider's energy to be needlessly wasted. In this respect, a problem common to most prior art rear suspension systems is the tendency of the rear suspension system to either lock-up or "squat" when the rider pedals aggressively. Since these prior art rear suspension systems are generally designed having a single lever arm which pivots about a single point, the lock-up or squat generally occurs as a result of chain tension acting on the single lever arm. If the single pivot point of the rear suspension system is above the chain line, the system will typically lock-up, thereby providing suspension only when the shock or bump force exceeds the chain tension. Conversely, if the single pivot point of the rear suspension system is below the chain line, the system will typically squat since the chain tension is acting to compress the shock absorber of the rear suspension system in the same manner as does the shock or bump force. The present invention specifically overcomes these and other deficiencies associated with prior art bicycle frames.

SUMMARY OF THE INVENTION

In accordance with a preferred embodiment of the present invention, there is provided a shock absorbing bicycle rear suspension linkage system which is adapted to provide the bicycle frame and hence the bicycle with enhanced riding comfort and performance. The bicycle rear suspension linkage system generally comprises an elongate seat tube having an upper pivot mount rigidly attached to the upper end thereof, and an axle receiving bracket rigidly attached to the lower end thereof. Rigidly attached to the axle receiving bracket is a lower pivot mount. Additionally, pivotally connected to the upper pivot mount is an upper rocker, while pivotally connected to the lower pivot mount is a lower rocker.

The linkage system further comprises first and second seat stay members having upper ends which are rigidly attached to a seat stay end housing and first and second chain stay members having front ends which are rigidly attached to a chain stay end housing. The seat stay end housing is pivotally connected to the upper rocker, with the chain stay end housing being pivotally connected to the lower rocker. Additionally, the back ends of the chain stay members are pivotally connected to the lower ends of the seat stay members. Rigidly attached to the lower ends of the seat stay members are a pair of rear tire axle receiving members.

Also included in the rear suspension linkage system is a shock absorber comprising a body portion and a reciprocable piston rod which extends axially from an upper end of the body portion which has a distal end pivotally connected to the upper pivot mount. In addition to the body portion and piston rod, the shock absorber further comprises a spring member which extends between the upper pivot mount and the body portion, with the piston rod extending axially through the spring member. Extending between the upper rocker and shock absorber are first and second upper link rods which have top ends pivotally connected to opposed sides of the upper rocker and bottom ends pivotally connected to opposed sides of the body portion of the shock absorber.

The rear suspension linkage system further comprises an elongate alignment rod having a proximal end threadably attached to the lower end of the shock absorber body portion in a manner wherein the alignment and piston rods are coaxially aligned. Also provided is a lower link rod which has a first end pivotally connected to the distal end of the alignment rod, and a second end which is pivotally connected to the chain stay end housing. In the preferred embodiment, the alignment rod extends through and is guided by at least one, and preferably a pair of alignment bushings which are rigidly attached to the seat tube. Additionally, the coaxially aligned alignment and piston rods preferably extend in parallel relation to the seat tube.

To maintain the linkage system in tension, the seat stay members and upper rocker are adapted to have a greater mechanical advantage in pulling upwardly on the first and second upper link rods alignment rod and lower link rod than the lower rocker has in pulling downwardly on such components. When the rear wheel is subjected to a shock force, the upper rocker is caused to pivot upwardly, which in turn causes the first and second upper link rods to be pulled upwardly. The upward movement of the upper link rods causes the alignment rod and hence the lower link rod to be pulled upwardly, which in turn facilitates the upward pivotal movement of the lower rocker. Advantageously, the upward pivotal movement of the lower rocker concurrently with the upward pivotal movement of the upper rocker allows the rear axle to move upwardly in a vertical direction when the shock force is applied to the rear wheel. Due to the connection of the upper link rods and alignment rod to the shock absorber, the amount of movement of the linkage system is controlled and limited thereby, with the spring member of the shock absorber being operable to dampen the shock force applied to the rear wheel.

BRIEF DESCRIPTION OF THE DRAWINGS

These, as well as other features of the present invention, will become more apparent upon reference to the drawings wherein.

DETAILED DESCRIPTION OF THE PREFERRED EMBODIMENT

Figure 1:
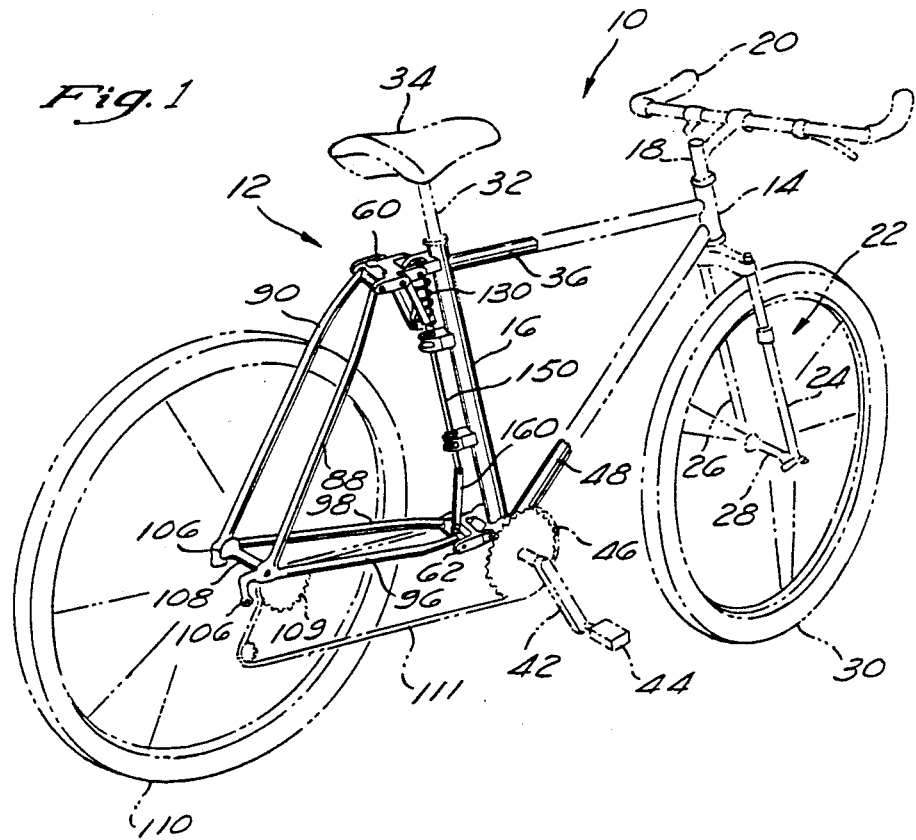
FIG. 1 is a perspective view of a bicycle incorporating the rear suspension linkage system constructed in accordance with the present invention.

Referring now to the drawings wherein the showings are for purposes of illustrating a preferred embodiment of the present invention only, and not for purposes of limiting the same, FIG. 1 perspectively illustrates a bicycle 10 incorporating a bicycle frame 12 constructed to incorporate the bicycle rear suspension and linkage system of the present invention. The bicycle frame 12 generally comprises a head tube 14 disposed at the front end of the bicycle 10 and a seat tube 16 disposed toward the rear end of the bicycle 10. Connected to the top end of the head tube 14 is a stem 18 to which is attached the handlebars 20. Connected to the bottom end of the stem 18 is a conventional front shock absorber assembly 22 defining a first fork 24 and a second fork 26 between which is mounted the axle 28 of the front wheel 30. Importantly, the front shock absorber assembly 22 is adapted to provide the impressive first fork member 24 and compressive second fork member 26 with shock absorbing capability. Telescopically received into the top end of the seat tube 16 is a seat post 32 having a saddle or seat 34 connected thereto.

Rigidly attached to and extending between the head tube 14 and seat tube 16 is an elongate cross bar 36. Additionally, rigidly attached to the bottom end of the seat tube 16 is an axle receiving bracket 38 having an axle receiving bore 40 extending axially therethrough. In the preferred embodiment, the axle receiving bracket 38 has a generally cylindrical configuration and is attached to the lower end of the seat tube 16 via a brazed or welded connection. The bore 40 of the axle receiving bracket 38 is sized and configured to receive a bottom bracket axle of the bicycle 10. Attached to the opposed ends of the bottom bracket axle are first and second cranks 42 to which are attached pedals 44. Additionally, attached to one end of the bottom bracket axle between the bottom bracket axle and a crank 42 is a main sprocket 46 which is adapted to rotate concurrently with the bottom bracket axle. Rigidly attached to and extending between the head tube 14 and the axle receiving bracket 38 is an elongate down tube 48. In the preferred embodiment, head tube 14, cross bar 36, axle receiving bracket 38, and down tube 48, each have generally cylindrical configurations and are secured to one another via welded or braised connections.

Figure 2:
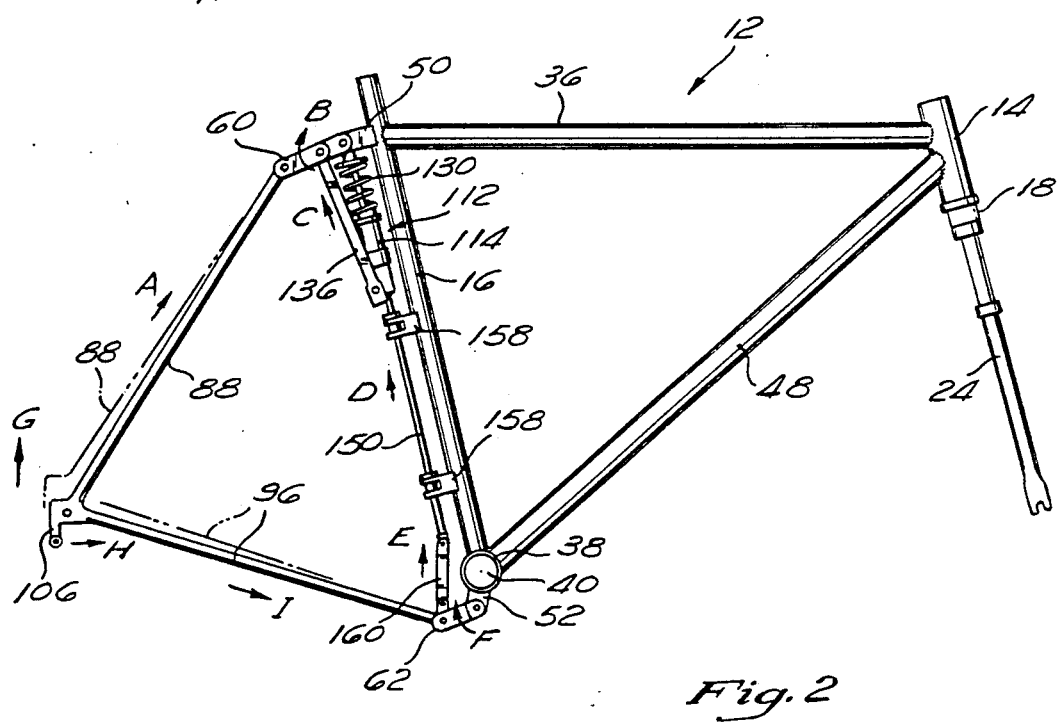
FIG. 2 is a side elevational view of the bicycle frame incorporating the rear suspension linkage system of the present invention.
Figure 3:
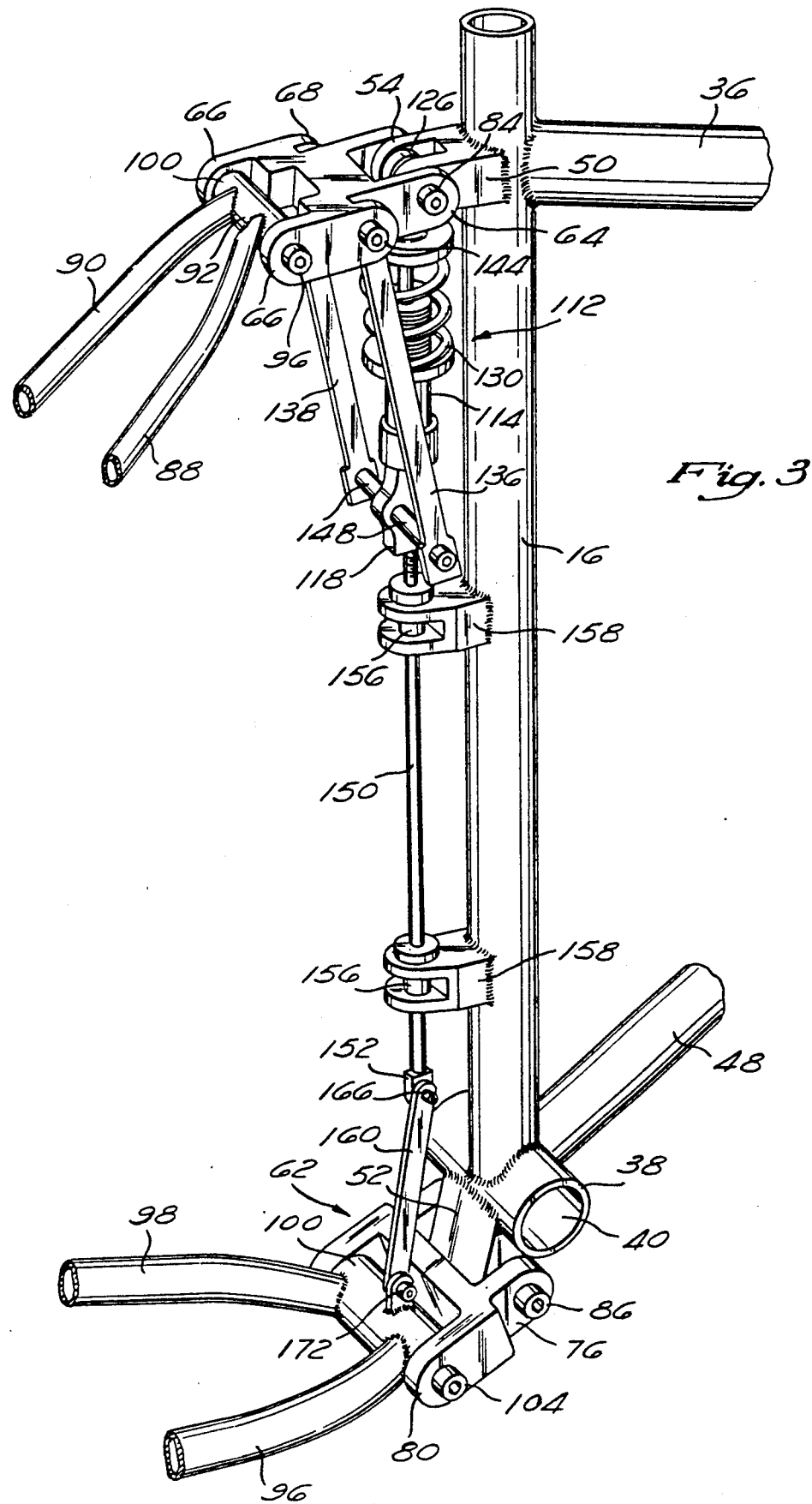
FIG. 3 is an enlarged perspective view of a portion of the rear suspension linkage system of the present invention.
Figure 4:
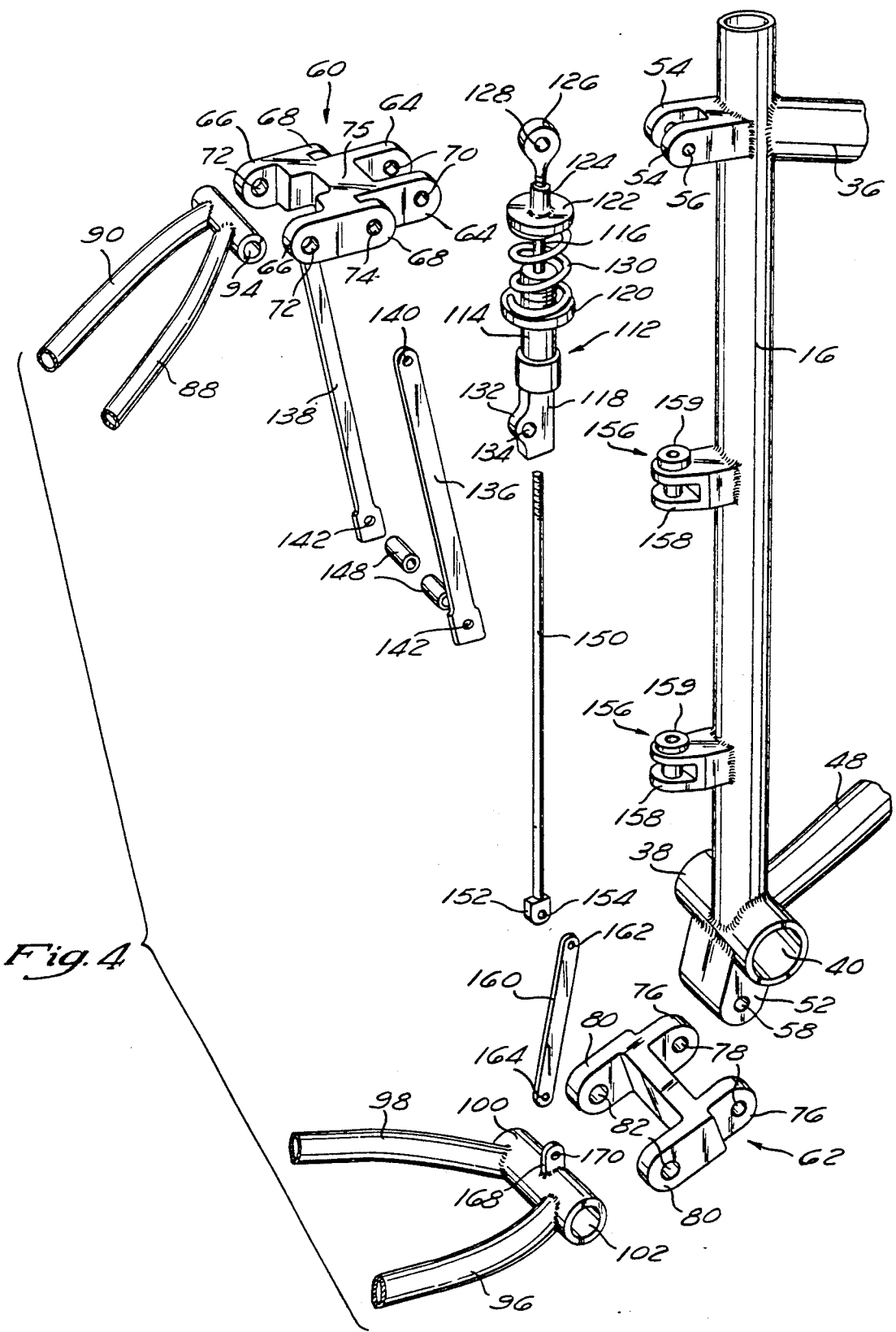
FIG. 4 is an exploded view of the rear suspension linkage system shown in FIG. 3.

Referring now to FIGS. 2-4, rigidly attached to the rear portion of the upper end of the seat tube 16 is an upper pivot mount 50. Additionally, rigidly attached to the lower portion of the axle receiving bracket 38 is a lower pivot mount 52. In the preferred embodiment, the upper pivot mount 50 includes a pair of ear portions 54 defining a space therebetween. Extending laterally through the ear portions 54 are apertures 56 which are disposed in coaxial alignment. Additionally, extending through the lower pivot mount 52 is an aperture 58. In the preferred embodiment, the upper pivot mount 50 and lower pivot mount 52 are attached to the seat tube 16 and axle receiving bracket 38, respectively, via a welding or brazing process.

Pivotally connected to the upper pivot mount 50 is an upper rocker 60, while pivotally connected to the lower pivot mount 52 is a lower rocker 62. In the preferred embodiment, the upper rocker 60 defines a front pair of mounting ears 64, a back pair of mounting ears 66, and an intermediate pair of mounting ears 68. Extending laterally through the front pair of mounting ears 64 are apertures 70 which are disposed in coaxial alignment, while extending laterally through the back pair of mounting ears 66 are apertures 72 which are also disposed in coaxial alignment. Additionally, extending laterally through the intermediate pair of mounting ears 68 are apertures 74 which are also disposed in coaxial alignment, although separated by the central portion of the upper rocker 60. Similar to the upper rocker 60, the lower rocker 62 defines a front pair of mounting ears 76 having a coaxially aligned pair of apertures 78 extending laterally therethrough, and a back pair of mounting ears 80 having a coaxially aligned pair of apertures 82 extending laterally therethrough. In the preferred embodiment, the upper rocker 60 is pivotally connected to the upper pivot mount 50 via the receipt of the ear portions 54 of the upper pivot mount 50 into the space defined between the front pair of mounting ears 64 of the upper rocker 60. In this respect, the distance separating the front pair of mounting ears 64 is adapted to slidably accommodate the ear portions 54 of the upper pivot mount 50. Importantly, the ear portions 54 are oriented between the front pair of mounting ears 64 such that the pair of apertures 56 disposed between the ear portions 54 are coaxially aligned with the pair of apertures 70 disposed within the mounting ears 64. Thereafter, a fastener 84 is inserted through the coaxially aligned apertures 56, 70 thus pivotally connecting the upper rocker 60 to the upper pivot mount 50. To facilitate the pivotal connection of the lower rocker 62 to the lower pivot mount 52, the lower pivot mount 52 is received into the space defined between the front pair of mounting ears 76 of the lower rocker 62. Like the pair of mounting ears 64 previously described, the distance separating the mounting ears 76 from each other is such that the lower pivot mount 52 may be slidably received therebetween. The lower pivot mount 52 is oriented between the mounting ears 76 such that the pair of apertures 78 are coaxially aligned with the aperture 58 of the lower mount 52. Thereafter, as seen in FIG. 3, a fastener 86 is extended through the coaxially aligned apertures 78, 58, thus pivotally connecting the lower rocker 62 to the lower pivot mount 52.

The bicycle frame 12 of the present invention further comprises first and second seat stay members 88, 90 which have upper ends rigidly attached to a seat stay end housing 92. The seat stay end housing 92 defines a bore 94 extending longitudinally therethrough, and is pivotally connected to the upper rocker 60. In this respect, the seat stay end housing 92 is received into the space defined between the back pair of mounting ears 66 of the upper rocker 60 which are spaced from each other a distance sufficient to allow the seat stay end housing 92 to be slidably received therebetween. The end housing 92 is oriented between the mounting ears 66 such that the apertures 72 of the mounting ears 64 are coaxially aligned with the bore 94. Thereafter, a fastener 96 is extended through the coaxially aligned apertures 72 and board 94, thus pivotally securing the end housing 92 to the upper rocker 60.

The bicycle frame 12 further includes first and second chain stay members 96, 98 which have front ends rigidly attached to a chain stay end housing 100. Like the end housing 92, the chain stay end housing 100 defines a bore 102 extending longitudinally therethrough and is pivotally connected to the lower pivot mount 52. In this respect, the back pair of mounting ears 80 of the lower rocker 62 are separated from each other a distance sufficient to allow the end housing 100 to be slidably received into the space defined between the mounting ears 80 in a manner wherein the apertures 82 of the mounting ears 80 are coaxially aligned with the bore 102 of the end housing 100. Thereafter, a fastener 104 is inserted into the coaxially aligned apertures and bore 102, thus pivotally connecting the end housing 100 to the lower rocker 62. In the preferred embodiment, the upper ends of the seat stay members 88, 90 and the front ends of the chain stay members 96, 98 are attached to their respective end housings 92, 100 via a welding or brazing process.

In the preferred embodiment, the back ends of the chain stay members 96, 98 are pivotally connected to the lower ends of the seat stay members 88, 90. Particularly, the back end of the first chain stay member 96 is pivotally connected to the lower end of the first seat stay member 88, with the back end of the second chain stay member 98 being pivotally connected to the lower end of the second seat stay member 90. Rigidly attached to the lower ends of the first and second seat stay members 88, 90 is a pair of rear tire axle receiving members 106 which are adapted to support the rear tire axle 108 of the rear wheel 110 therebetween. Attached to one end of the rear tire axle 108 is a rear sprocket 109 which is cooperatively engaged to the main sprocket 46 via a chain 111.

One of the primary components of the bicycle frame 12 is a shock absorber 112. In the preferred embodiment, the shock absorber comprises a tubular body portion 114 having a reciprocable piston rod 116 extending axially from its top end, and a mounting bracket 118 attached to and extending downwardly from its bottom end. As best seen in FIGS. 3 and 4, a portion of the outer surface of the body portion 114 adjacent the upper end thereof is threaded so as to allow a lower spring retention member 120 to be threadably received onto the body portion 114. Additionally, rigidly attached to the distal end of the piston rod 116 is an upper spring retention member 122 including an internally threaded stem 124 formed on the upper surface thereof. Threadably received into the stem 124 is a coupling member 126 including an aperture 128 extending laterally through a circular portion thereof. The shock absorber 112 further comprises a helical spring member 130 disposed between the upper and lower spring retention members 120, 122, in a manner wherein the upper end of the spring member 130 abuts the lower surface of the upper spring retention member 122, the lower end of the spring member 130 abuts the top surface of the lower spring retention member 120, and the piston rod 116 of the shock absorber 112 extends axially through the center of the spring member 130. As will be recognized, the tension of the spring member 130 is selectively adjustable via the selective placement of the lower spring retention member 120 on the threaded outer surface portion of the body portion 114.

As best seen in FIG. 3, the coupling member 126, and hence the piston rod 116, is pivotally connected to the upper pivot mount 50. In this respect, the coupling member 126 is sized so as to be slidably receivable into the space defined between the ear portions 54 of the upper pivot mount 50 in a manner wherein the apertures 56 of the ear portions 54 are coaxially aligned with the aperture 128 of the coupling member 126. As previously specified, the upper rocker 60 is also pivotally connected to the upper pivot mount 50 via the receipt of the fastener 84 into the coaxially aligned apertures 70 and 56. As such, in the preferred embodiment, the fastener 84 is utilized to pivotally interconnect the upper pivot mount 50 to the upper pivot mount 60 and coupling member 126 via the extension thereof through the coaxially aligned apertures 70, 56 and 128. As best seen in FIG. 4, the mounting bracket 118 includes a hub 132 formed along the back vertical edge thereof and including an aperture 134 extending laterally therethrough.

The bicycle frame 12 further comprises first and second upper link rods 136, 138 which are used to pivotally connect the upper rocker 60 to the mounting bracket 118 of the shock absorber 112. The first and second upper link rods 136, 138 are identically configured and include apertures 140 disposed in their upper ends, and apertures 132 disposed in their lower ends. In the preferred embodiment, the upper link rods 136, 138 are sized such that the upper ends thereof are slidably receivable into respective spaces defined between the intermediate pair of mounting ears 68 and the main body portion of the upper rocker 60 in a manner wherein the apertures 140 disposed within the upper ends are coaxially aligned with the apertures 74 disposed within the mounting ears 68. Thereafter, a fastener 144 is extended through the coaxially aligned apertures 74, 140 as well as an aperture (not shown) extending through the main body portion of the upper rocker 60 in coaxial alignment with the apertures 74, 140, thus pivotally connecting the upper link rods 136, 138 to the upper rocker 60. The bottom ends of the upper link rods 136, 138 are then oriented over the opposed planar sides of the mounting bracket 118 such that the apertures 142 are coaxially aligned with the aperture 134 extending through the hub 132. Thereafter, a fastener 146 is extended through the coaxially aligned apertures 142, 134 thus pivotally securing the lower ends of the upper link rods 136, 138 to the mounting bracket 118, and hence the shock absorber 112. Importantly, the fastener 146 is also extended between a pair of sleeves 148 which are sized and adapted to cover the exposed portions of the fastener 146 extending between the bottom ends of the upper link rods 36, 138 and mounting bracket 118. The sleeves 148 each have a tubular configuration.

Rigidly attached to and extending downwardly from the shock absorber 12, and more particularly the mounting bracket 118, is an elongate alignment rod 150. In the preferred embodiment, the upper end of the alignment rod 150 is externally threaded so as to be threadably receivable into an internally threaded aperture (not shown) disposed within the bottom surface of the mounting bracket 118. Importantly, the alignment rod aperture disposed in the bottom surface of the mounting bracket 118 is oriented such that the alignment rod 150 is coaxially aligned with the piston rod 116 of the shock absorber 112 when threadably received thereinto. Formed on the lower end of the alignment rod 150 is an enlarged head portion 152 which includes an aperture 154 extending laterally therethrough. In the preferred embodiment, the alignment rod 150 is extended through and is guided by at least one, and preferably a pair of alignment bushings 156. Each of the alignment bushings 156 are disposed within alignment brackets 158 which are rigidly attached to a rear portion of the seat tube 116 via a welding or brazing process. As will be recognized, the threaded upper end of the alignment rod 150 is extended upwardly through the lower and upper alignment bushings 156 in succession, prior to being threadably received into the alignment rod mounting aperture. Each of the alignment bushings 156 includes an enlarged head portion overlying the top surface of a respective alignment bracket 158. In the preferred embodiment, when the alignment rod 150 is extended through the alignment bushings 156 and threadably attached to the mounting bracket 118, the alignment rod 150 and piston rod 116 which are coaxially aligned will also extend in generally parallel relation to the seat tube 116.

The final component comprising the rear suspension linkage system is a lower link rod 160 having a top end including an aperture 162 extending therethrough, and a bottom end having an aperture 164 extending therethrough. In the preferred embodiment, the top end is pivotally connected to the head portion 152 of the alignment rod 150 by coaxially aligning the apertures 162, 154 and extending a fastener 166 therethrough. The lower end of the lower link rod 160 is pivotally connected to an extension 168 which is rigidly attached to and extends upwardly from a central portion of the chain stay and housing 100 and includes an aperture 170 extending therethrough. In this respect, the pivotal connection between the lower link rod 160 and extension 168 is facilitated by coaxially aligning the apertures 164, 170, and extending a fastener 172 therethrough.

As previously specified, in most prior art rear suspension systems, the rear axle of the rear wheel pivots about a single point which typically causes the pedaling forces to compress or extend the suspension and/or the rear wheel axle to move in a motion other than parallel to the direction of the force being applied to the rear wheel. In those cases wherein the suspension is affected by the pedal force, a portion of the rider's energy is wasted since such energy is used to needlessly activate the shock absorber of the rear suspension. Additionally, if the rear tire axle moves in an arc that is not tangent to the direction of the shock force applied to the rear wheel, efficiency is lost. Importantly, the various components comprising the rear suspension and linkage system of the present invention as previously described are adapted to provide a suspension for the rear wheel 110 of the bicycle 10 that is negligibly affected by the pedaling force, and allows the rear axle 108 to move in a direction which is substantially parallel to the direction of the shock force exerted to the rear wheel 110 when such encounters a bump or other obstruction.

Referring now to FIGS. 1-3, when a shock force is applied to the rear wheel 110 of the bicycle 10, due to the attachment of the rear tire axle receiving members 106 to the seat stay members 88, 90, the seat stay members 88, 90 are caused to pivot upwardly in the direction A. The upward pivotal movement of the seat stay members 88, 90 in turn causes the upper rocker 60 to pivot upwardly in the direction B shown in FIG. 2. As will be recognized, the upward pivotal motion of the upper rocker 60 serves to pull the first and second upper link rods 136, 138 upwardly in the direction C, thus facilitating the compression of the helical spring member 130 between the upper and lower spring retention members 120, 122. The upward pulling of the upper link rods 136, 138 also causes the alignment rod 150 to be pulled upwardly in the direction D through the alignment bushings 156, which in turn causes the lower link rod 160 to be pulled upwardly in the direction E. The upward pulling of the lower link rod 60 in the direction E causes the lower rocker 62 to pivot upwardly in the direction F. Advantageously, due to the structure of the rear suspension and linkage system, the concurrent upward pivoting of the upper rocker 60 in the direction B and the lower rocker 62 in the direction F causes the rear axle receiving brackets 106 and hence the rear axle 108 and rear tire 110 to move generally vertically upwardly in the direction G when subjected to a shock force, rather than moving in an arc which facilitates lost efficiency.

In the preferred embodiment, the upper rocker 60 and seat stay members 88, 90 pivotally connected thereto are adapted to have a greater mechanical advantage on the connecting linkage comprising the shock absorber 112, upper link rods 136, 138, alignment rod 150 and lower link rod 160, then does the lower rocker 62 and pivotally connected chain stay members 96, 98. In this respect, the adapting of the upper rocker 60 and seat stay members 88, 90 to possess the greater mechanical advantage serves to control the action of the remaining components of the linkage system and assures that the linkage assembly is nearly always in tension. As previously specified, the upward movement in the direction C of the upper link rods 136, 138 as caused by the upward pivotal movement in the direction B of the upper rocker 60 is controlled and limited by the shock absorber 112. In this respect, the shock absorber 112 is adapted to dampen some of the shock force exerted on the rear tire 10 as such force is transmitted through the linkage assembly. In this respect, the degree of the shock force absorbed by the shock absorber 112 may be selectively adjusted via the positioning of the lower spring retention member 120 along the threaded outer surface portion of the body portion 114.

As also previously specified, most prior art rear suspension systems are designed having a single lever arm which pivots about a single point. In this respect, these rear suspension systems have the tendency to either lock up or squat when the rider pedals aggressively, which occurs as a result of the chain tension acting on the single lever arm of the system. If the single pivot point is above the chain line, the rear suspension system will typically lock-up, thereby providing suspension only when the shock force exceeds chain tension. Conversely, if the single pivot point is below the chain line, the rear suspension system will typically squat since the chain tension is acting to compress the shock absorber in the same manner as a shock force.

In the present linkage assembly, the application of a shock force to the rear wheel 110 tends to move the rear wheel 110 in the upward vertical direction G, and pivot the upper and lower rockers 60, 62 upwardly in the directions B, F. However, in the preferred embodiment, the upper and lower rockers 60, 62 and alignment rod 150 are specifically oriented such that chain tension, occurring as a result of pedaling, tends to force the upper and lower rockers 60, 62 in opposite directions thereby producing pure tension in the alignment rod 150 and causing no influence in the vertical travel of the rear wheel 110 in the direction G. In this respect, when the bicycle 10 is vigorously pedaled, the chain 111 tends to pull the rear sprocket 109 toward the front of the bicycle 10 in the direction H shown in FIG. 2. The pulling of the rear sprocket 109 in the direction H causes a force to be transmitted upwardly through the seat stay members 88, 90 in the direction A, and a force to be transmitted downwardly through the chain stay members 96, 98 in the direction I also shown in FIG. 2. The transmission of force in the direction A tends to pivot the upper rocker 60 upwardly in the direction B, while the transmission of force in the direction I tends to pivot the lower rocker 62 downwardly in a direction opposite the direction F, thus producing the tension in the alignment rod 150 as previously described.

In addition to the foregoing, due to the configuration of the linkage assembly, the rear wheel 110 is free to accommodate vertical travel as a result of a vertical shock force despite the linkage assembly being under the effect of chain tension. As a result, the present linkage system is fully active and can absorb bumps and shocks to identical degrees of efficiency regardless of the magnitude of chain tension, and will neither lock up or squat under the influence of pedaling.

Additional modifications and improvements of the present invention may also be apparent to those skilled in the art. Thus, the particular combination of parts described and illustrated herein is intended to represent only one embodiment of the invention, and is not intended to serve as limitations of alternative devices within the spirit and scope of the invention.

What is claimed is:

1. A bicycle rear suspension linkage, system, comprising:
   an elongate seat tube having upper and lower ends;
   an upper rocker pivotally connected to said upper end of said seat tube;
   a lower rocker pivotally connected to said lower end of said seat tube;
   first and second seat stay members having upper and lower ends, said upper ends being pivotally connected to said upper rocker;
   first and second chain stay members having front ends pivotally connected to said lower rocker and back ends connected to the lower ends of said seat stay members;
   a shock absorber having a body portion and a reciprocal piston rod extending axially from said body portion, said piston rod defining a distal end pivotally connected to said upper end of said seat tube;
   first and second upper link rods having top ends pivotally connected to said upper rocker and bottom ends pivotally connected to the body portion of said shock absorber;
   an elongate alignment rod having proximal and distal ends, said proximal end being rigidly attached to the body portion of said shock absorber in a manner wherein said alignment and piston rods are coaxially aligned; and
   a lower link rod having a first end pivotally connected to the distal end of said alignment rod and a second end pivotally connected to the front ends of said chain stay members.

2. The linkage system of claim 1 wherein the seat stay members and the upper rocker are adapted to have a greater mechanical advantage in pulling upwardly on the upper link rods, alignment rod and lower link rod than the chain stay members and lower rocker have in pulling downwardly on the lower link rod, alignment rod and upper link rods so as to maintain the linkage system in tension.

3. The linkage system of claim 1 wherein the coaxially aligned alignment and piston rods extend in parallel relation to said seat tube.

* * * * *